(12) United States Patent
Horn (10) Patent No.: US 9,841,007 B2
(45) Date of Patent: Dec. 12, 2017

(54) WIND TURBINE TOWER AND METHOD FOR ERECTING A WIND TURBINE TOWER

(71) Applicant: WOBBEN PROPERTIES GMBH, Aurich (DE)

(72) Inventor: Günther Horn, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 15/313,395

(22) PCT Filed: May 26, 2015

(86) PCT No.: PCT/EP2015/061515
§ 371 (c)(1),
(2) Date: Nov. 22, 2016

(87) PCT Pub. No.: WO2015/177377
PCT Pub. Date: Nov. 26, 2015

(65) Prior Publication Data
US 2017/0184076 A1 Jun. 29, 2017

(30) Foreign Application Priority Data
May 23, 2014 (DE) .................. 10 2014 209 857

(51) Int. Cl.
*E04H 12/22* (2006.01)
*F03D 13/10* (2016.01)
(Continued)

(52) U.S. Cl.
CPC ......... *F03D 13/10* (2016.05); *E04H 12/2284* (2013.01); *E04H 12/342* (2013.01);
(Continued)

(58) Field of Classification Search
CPC ............................ F03D 13/22; E04H 12/2284
See application file for complete search history.

(56) References Cited

U.S. PATENT DOCUMENTS 4,076,299 A * 2/1978 Dalton .................. B60P 1/6427
410/52
6,193,442 B1 * 2/2001 May ........................ E02D 35/00
405/232
(Continued)

FOREIGN PATENT DOCUMENTS

CA          2831782 C  *  8/2016  ............. E02D 27/42
CN       201401294 Y       2/2010
(Continued)

*Primary Examiner* — Babajide Demuren
(74) *Attorney, Agent, or Firm* — Seed Intellectual Property Law Group LLP (57) ABSTRACT

A wind turbine tower is provided with a plurality of tower segment which are placed one on top of the other in order to form the tower. A lower tower segment has a lower end face, and in the lower region of the lower tower segment, the lower tower segment has a plurality of recesses and throughbores between the lower end face of the lower tower segment and a base of the recesses. The recesses are designed to receive a leveling unit for leveling the lower tower segment. The recesses are preferably provided on the inner face of the lower tower segment and provide an effective possibility for receiving leveling units.

9 Claims, 6 Drawing Sheets

(51) Int. Cl.
*F03D 13/20* (2016.01)
*E04H 12/34* (2006.01)

(52) U.S. Cl.
CPC ........ *F03D 13/22* (2016.05); *F05B 2230/604* (2013.01); *F05B 2230/61* (2013.01)

(56) References Cited

U.S. PATENT DOCUMENTS

| | | | | |
|---|---|---|---|---|
| 7,533,505 | B2* | 5/2009 | Henderson | E02D 27/42 405/228 |
| 7,614,200 | B2* | 11/2009 | Wobben | E02D 27/42 248/125.8 |
| 2010/0140949 | A1* | 6/2010 | Pitre | F03D 1/0658 290/55 |
| 2011/0088336 | A1* | 4/2011 | Larsen, Jr. | E04G 23/06 52/126.1 |
| 2013/0129525 | A1 | 5/2013 | Pabst | |
| 2013/0239423 | A1* | 9/2013 | Knudsen | G01D 1/00 33/377 |
| 2014/0075864 | A1* | 3/2014 | Foss | E02B 17/0004 52/223.4 |
| 2014/0115978 | A1 | 5/2014 | Fairbairn | |
| 2014/0259989 | A1* | 9/2014 | Gregory | E04G 23/065 52/126.6 |
| 2014/0298737 | A1 | 10/2014 | Fernandez Gomez et al. | |
| 2016/0201350 | A1* | 7/2016 | Zavitz | E02D 27/425 52/223.5 |
| 2017/0044734 | A1* | 2/2017 | Ollgaard | E02D 27/425 |

FOREIGN PATENT DOCUMENTS

| | | | |
|---|---|---|---|
| CN | 201874761 U | 6/2011 | |
| DE | 10226996 A1 * | 4/2003 | ............ E02D 27/42 |
| DE | 202010001337 U1 | 7/2011 | |
| WO | 2012168467 A2 | 12/2012 | |

* cited by examiner

WIND TURBINE TOWER AND METHOD FOR ERECTING A WIND TURBINE TOWER

BACKGROUND

Technical Field

The present invention relates to a wind turbine tower and to a method for erecting a wind turbine tower.

Description of the Related Art

For towers of wind turbines, the construction of a durably stable and even foundation is of great importance. The foundation of a wind turbine is constructed by first creating, in a foundation bed, what is termed a blinding layer, that is to say a layer of cement or concrete which is as planar and as horizontal as possible. Then, anchor rods are fixed to the foundation segments, i.e., the lower segments of the tower consisting of multiple segments, by means of which anchor rods the foundation segment is positioned on the blinding layer. In order to even out unevennesses in the blinding layer and to orient the foundation segment as horizontally as possible, the anchor rods are screwed into the underside of the foundation segment to varying extents. To that end, the anchor rods have a threaded rod.

DE 102 26 996 A1 describes a method for erecting a foundation of a wind turbine tower consisting of multiple segments. To that end, a foundation bed is excavated and a stable, essentially even and horizontal blinding layer is created. A foundation segment of the wind turbine is placed on the blinding layer, wherein at least three height-adjustable anchor rods are attached, by means of a supporting foot attached to the end of the anchor rod, to the foundation segments in a distributed manner such that only the anchor rods are established at predefined supporting points on the blinding layer. Then, a reinforcement is produced on the blinding layer and the remaining foundation is cast up to above the lower rim of the foundation segment using a foundation material such as concrete.

In the German patent application forming the basis for priority, the German Patent and Trademarks Office has searched the following documents: DE 102 26 996 A1, DE 20 2010 001 337 U1, US 2013/0129525 A1 and WO 2012/168467 A2.

BRIEF SUMMARY

The present invention is directed to a wind turbine tower and a method for erecting a wind turbine tower, which permits simple and exact orientation and/or levelling of the lower tower segment.

Thus, provided is a wind turbine tower with a plurality of tower segments which are placed one on top of another so as to form the tower. A lower tower segment has a lower end face and in the lower region of the tower segment or in the region of the lower end face a plurality of cavities and through bores between the lower end face of the lower tower segment and a bottom of the cavity. The cavities are configured for receiving a levelling unit for levelling the lower tower segment. The cavities are preferably provided on the inside of the lower tower segment and represent an effective possibility for receiving levelling units.

According to one aspect, a plurality of levelling units is placed in the cavities. Each of the levelling units has a supporting foot and/or a rod which can be inserted through the through bore into the cavity. The levelling unit is configured to set the length of the rod or the separation between the lower end of the supporting foot and the bottom of the cavity for levelling the lower tower segment.

According to a further aspect, the levelling unit has a hydraulic unit for setting the length of the rod for levelling the lower tower segment.

It is thus possible for the lower tower segment to be levelled in particular automatically and very precisely by means of the hydraulic unit.

According to a further aspect, the levelling unit has a supporting frame with two sidewalls, a bottom and a cover as well as an intermediate bottom. The bottom and the intermediate bottom each have a cutout, such that the supporting frame can be inserted into the cavity if the rod and/or the supporting foot has been inserted through the through hole into the cavity.

According to a further aspect, a nut is screwed onto the rod. For arresting the levelling of the lower tower segment, the nut is screwed onto the rod such that it bears beneath the intermediate bottom.

According to a further aspect, the supporting foot and the (threaded) rod can be configured as one part or in two parts.

The invention also relates to a method for erecting a wind turbine tower which has a lower tower segment that has a plurality of cavities in the lower region. The lower tower segment further has a plurality of through bores between a lower end face of the lower tower segment and a bottom of the cavity. One end of the supporting foot and/or of a rod is inserted through the through bore. A levelling unit is placed into the cavity and the lower tower segment is oriented and/or levelled using the levelling units by setting the separation between the lower end of the supporting foot and the bottom of the cavity or the cavity itself.

The invention relates to the concept, of providing, in the lower region of the lowest tower segment of the tower of the wind turbine and on the inside of the tower, a plurality of cavities which are open inwards and which each have a through bore towards the underside of the lowest tower segment. A levelling unit is inserted into this cavity, wherein a (threaded) rod with a foot is pushed through the through bore from below, such that the tower segment rests on the feet.

The height or the length of the (levelling) foot can optionally be set hydraulically. If, at this point, a plurality of cavities and levelling units is provided along the circumference of the lower tower segment, it is then possible, by controlling the hydraulics, to set the height of the levelling feet of the respective levelling units such that the lowest tower segment is levelled to horizontal. In order to check the horizontal levelling, optical measuring units such as lasers or the like can be used.

The levelling unit has a (levelling) foot with a (threaded) rod which is provided through the through bore between the lower end face of the lowest tower segment and the bottom of the cavity. A nut is provided at the upper end of the threaded rod. Then, a levelling frame (e.g., in the form of a supporting frame) can be inserted into the cavity. The levelling frame has a bottom and an intermediate bottom, each with a cutout, such that the levelling frame can be introduced into the cavity after the threaded rod has been introduced through the through bore. The intermediate bottom of the levelling frame is then located above the nut. The frame can then be screwed upwards by actuating the nut, such that it bears against the underside of the intermediate bottom. In this case, the load exerted by the lower tower segment on the foundation, can be transmitted to the levelling foot via the intermediate bottom, the nut and the threaded rod.

A plurality of cavities and/or recesses is provided on the inside and in the lower region of the lower tower segment.

A through bore is provided between the cavity and the lower end face of the lower tower segment. The cavity and the through bore can subsequently be bored or milled into the lower tower segment. Alternatively, during production of the tower segment, which is typically a concrete tower segment, both the cavities and the through holes can be left free.

Further configurations of the invention form the subject matter of the subclaims.

BRIEF DESCRIPTION OF THE SEVERAL VIEWS OF THE DRAWINGS

Advantages and exemplary embodiments of the invention are explained in more detail below with reference to the drawing.

DETAILED DESCRIPTION

Figure 1:
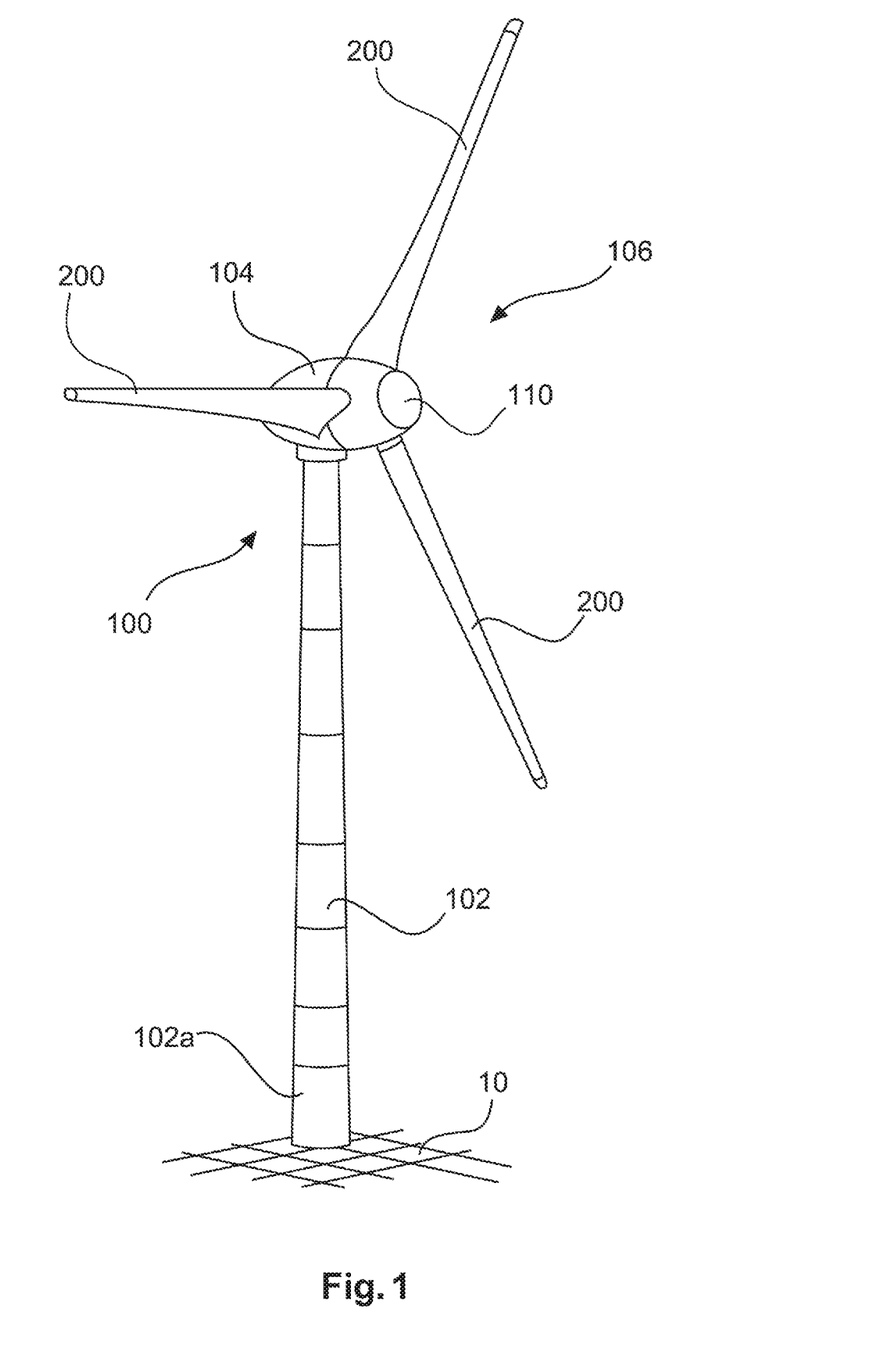
FIG. 1 shows a schematic representation of a wind turbine according to the invention.

FIG. 1 shows a schematic representation of a wind turbine according to the invention. The wind energy 100 has a tower 102 and a nacelle 104 on the tower 102. The tower 102 has a plurality of tower segments 102a which are placed one after another on a foundation 10 in order to form the tower 102. On the nacelle 104 there is provided an aerodynamic rotor 106 with three rotor blades 200 and a spinner 110. When the wind turbine is in operation, the aerodynamic rotor 106 is set in rotation by the wind and thus also turns a rotor of a generator, which is coupled either directly or indirectly to the aerodynamic rotor 106. The electric generator is arranged in the nacelle 104 and generates electrical energy. The pitch angles of the rotor blades 200 can be changed by pitch motors at the rotor blade roots of the respective rotor blades 200.

Figure 2A:
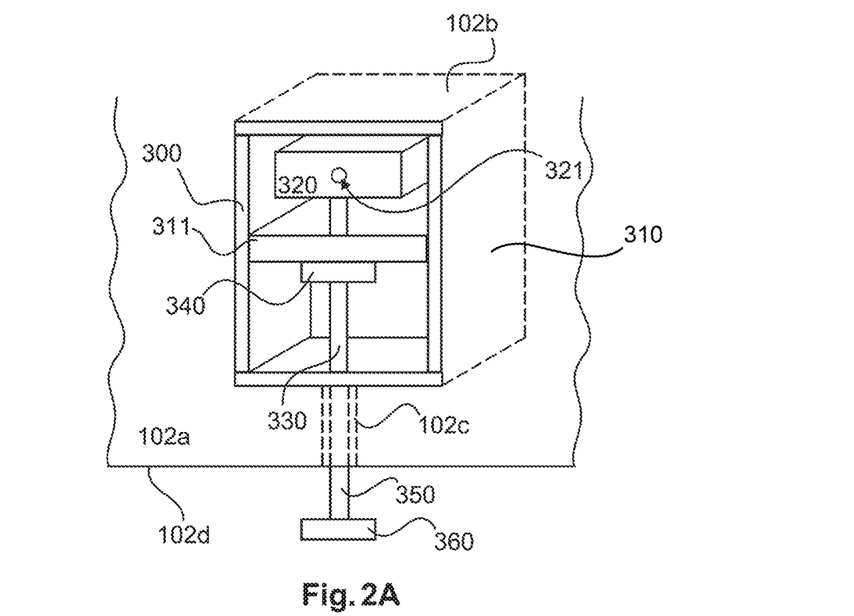
FIG. 2A shows a schematic representation of a lower tower segment of a wind turbine tower according to a first exemplary embodiment.

FIG. 2A shows a schematic representation of a detail of a lower tower segment of a wind turbine tower according to a first exemplary embodiment. A plurality of cavities 102b is provided in the lower tower segment 102a. The lower tower segment 102a has a (lower) end face 102d. In the lower tower segment 102a there is provided a plurality of through holes or through bores 102c which extend between the lower end face 102d and a bottom 102e (FIG. 2B) of the cavity 102b. A levelling unit 300 is provided in the cavity 102b. The levelling unit 300 has a supporting frame 310, an intermediate bottom 311, a hydraulic unit 320, a threaded rod 330 and a supporting foot 350. A levelling foot 360 is provided at the lower end of the supporting foot 350. The supporting foot 350 and the levelling foot 360 can be configured as one component. The threaded rod 330 and the supporting foot 350 can be configured as one component (with the threaded rod above and the supporting foot below) or as separate components. A nut 340 is screwed on over the upper end of the threaded rod 330. The supporting foot 350 with the levelling foot 360 is inserted into the through bore 102c. Then, the threaded rod 330 can be secured to (e.g., screwed onto) the supporting foot and the nut 340 can be screwed onto the threaded rod 330. After this, a supporting frame 310 of the levelling unit 300 is introduced into the cavity 102b. To that end, in reference also to FIG. 3, the bottom 310c and the intermediate bottom 311 each have a cutout 310f, 311a, (FIG. 5) such that the frame 310 is pushed into the cavity 102b and the supporting foot 350 is accommodated in the two cutouts 310f, 311a. The levelling unit 300 also has a hydraulic unit 320 with a hydraulic connection 321. A hydraulic hose 321 can be connected to the hydraulic connection 321, such that the hydraulic unit 320 can be activated. When the hydraulic unit 320 is activated, it can then press on the upper end of the threaded rod 330 and can thus raise or lower the lower tower segment 102a.

Figure 2B:
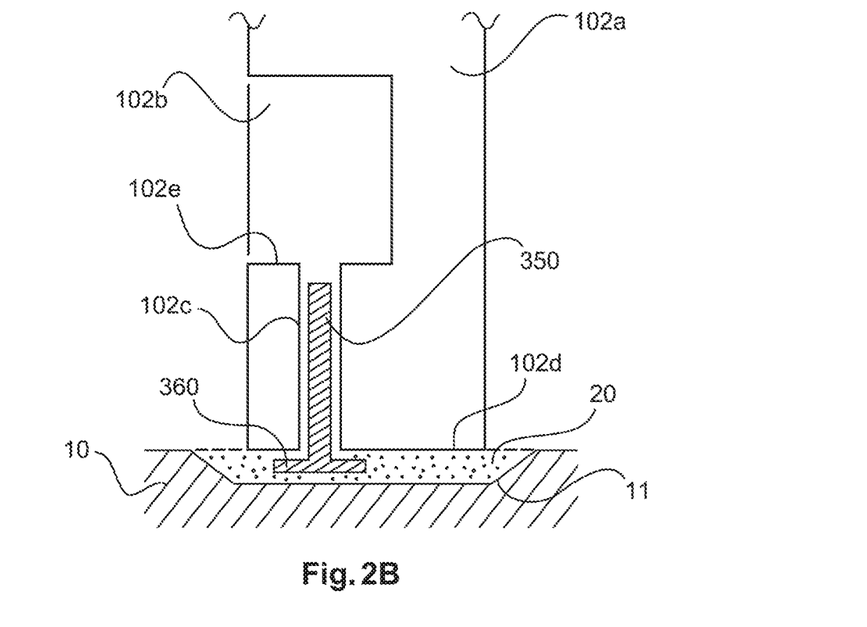
FIG. 2B shows a schematic section view of a lower tower segment according to the first exemplary embodiment.

FIG. 2B shows a schematic section view of a lower tower segment according to the first exemplary embodiment. The lower tower segment 102a has a lower end face 102d and a plurality of cavities 102b. Preferably, the cavities 102b are configured such that they are open towards the inside of the tower segment. The cavities 102b have a bottom 102e. Between the bottom 102e of the cavity 102b and the end face 102d of the lower tower segment there is provided a through bore 102c. A supporting foot 350 can be inserted (from below) into this through bore 102c. The supporting foot 350 can have a levelling foot 360. Optionally, the supporting foot 350 and the levelling foot 360 can be configured as one component. After the supporting feet 350 have been introduced into the through bores 102c, a lower tower segment can be placed on a foundation 10 of the wind turbine. Optionally, a cutout 11 can be provided on the upper side of the foundation 10. The supporting feet 350 and thus the lower tower segment or the lower end face 102d of the lower tower segment can be placed in the region of the cutout 11. After the lower tower segment 102a has been oriented by means of the levelling unit 300, the cutout 11 can be filled with Pagel mass or with a curable casting compound. This is advantageous because thus the weight of the lower tower segment and of the further tower segments and finally of the nacelle and of the rotor then rests not only on the supporting feet 350, but is distributed by the Pagel mass 20.

Figure 3:
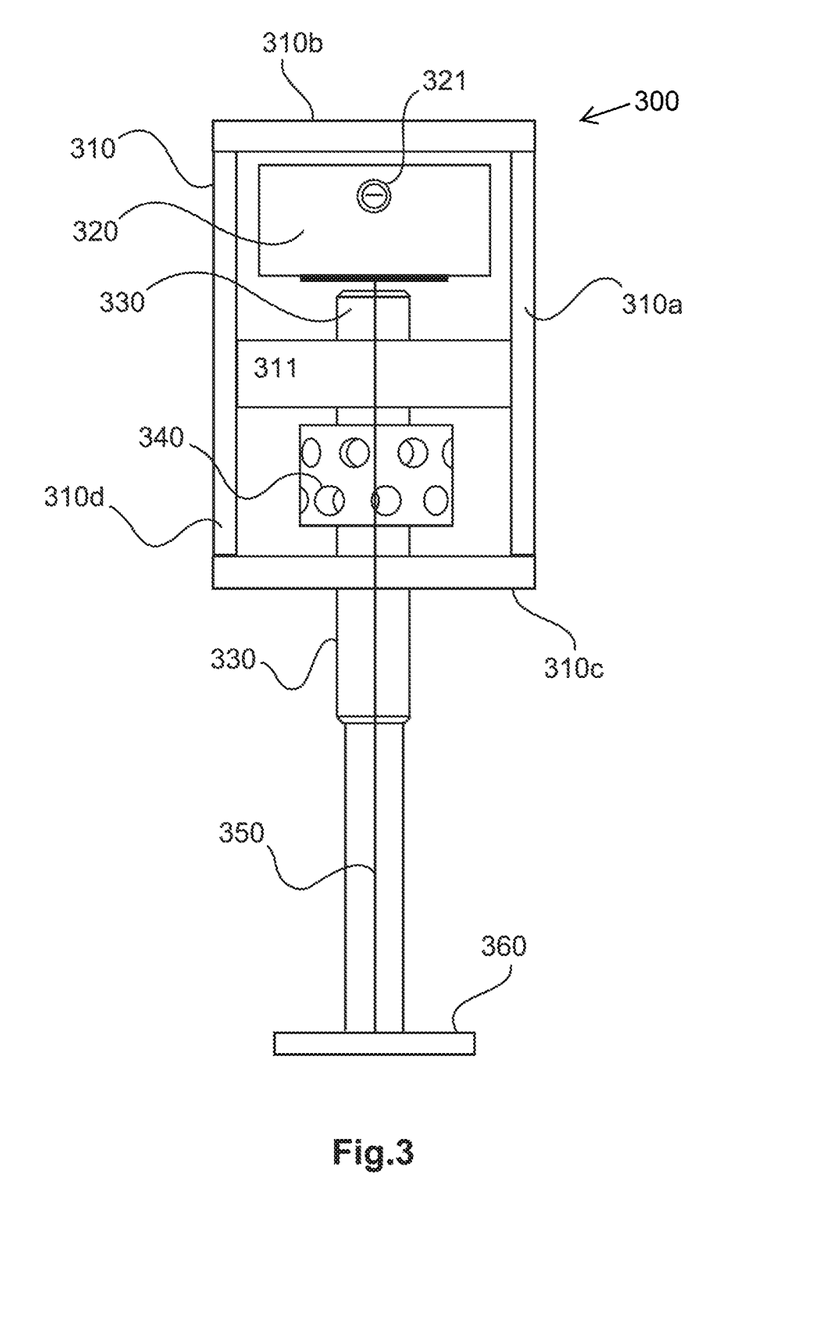
FIG. 3 shows a schematic representation of a levelling unit for levelling a lower tower segment of a wind turbine tower according to a second exemplary embodiment.

FIG. 3 shows a schematic representation of the levelling unit according to a second exemplary embodiment. The levelling unit 300 has a (supporting) frame 310 with two sidewalls 310a, 310d, a cover 310b, a bottom 310c and an intermediate bottom 311. The bottom 310c and the intermediate bottom 311 can each have a longitudinal cutout 310f, 311a. The levelling unit 300 further has a threaded rod 330, a supporting foot 350 and a levelling foot 360 at one end of the supporting foot 350. The nut 340 is screwed on over the other end of the threaded rod 330. In the installed state, the second end of the threaded rod 330 projects beyond the intermediate bottom 310. The supporting foot and the threaded rod 330 can be configured as separate components or as one component.

Figure 4:
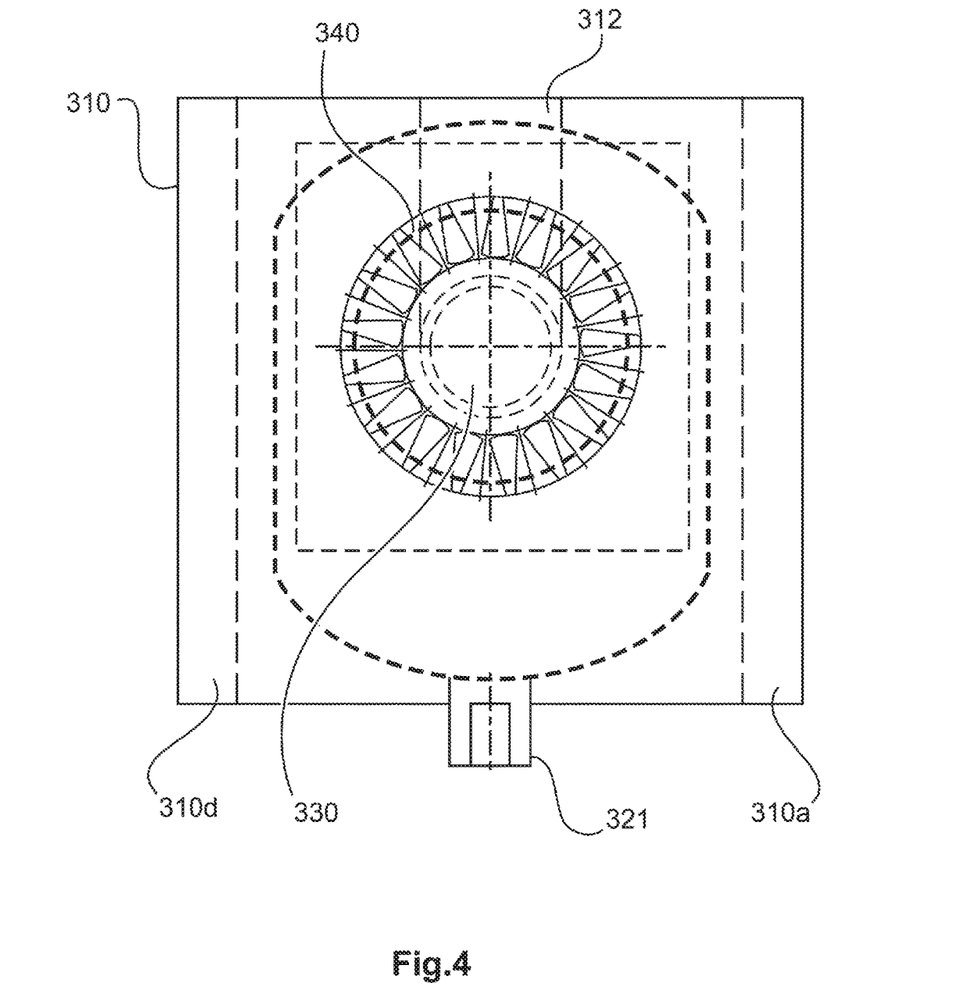
FIG. 4 shows a schematic plan view of the levelling unit of FIG. 3.

FIG. 4 shows a schematic representation of a schematic cross section of a levelling unit according to FIG. 3. The levelling unit has a supporting frame with two sidewalls 310d, 310a. Further, the levelling unit has an intermediate bottom 311 and a bottom 310c. A cutout 312 is provided in the bottom 310c. The same is true in corresponding fashion for the intermediate bottom 311. The cutout 312 serves for receiving the threaded rod 350, 330.

The levelling unit further has a threaded rod 330 and a nut 340.

Figure 5:
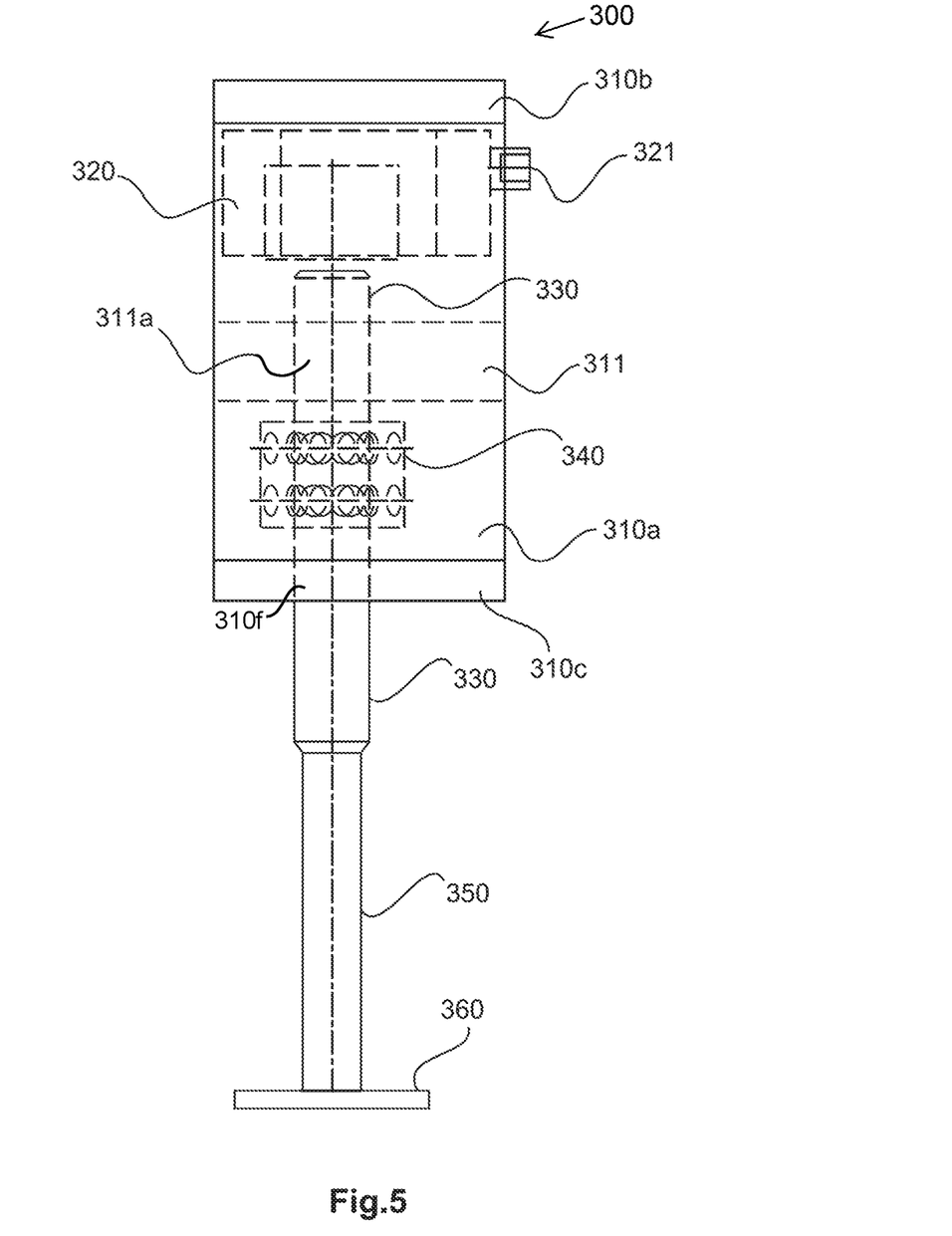
FIG. 5 shows a schematic side view of the levelling unit of FIG. 3.

FIG. 5 shows a perspective side view of a levelling unit according to the second exemplary embodiment. The levelling unit 300 has a supporting foot 350 with a (levelling) foot 360. The levelling unit 300 further has a supporting frame 310 with a bottom 310c, a cover 310b, two sidewalls 310a, 310d and an intermediate bottom 311. The intermediate bottom 311 and the bottom 310c each have a cutout such that the threaded rod can be received in the cutout.

Figures 6, 7:
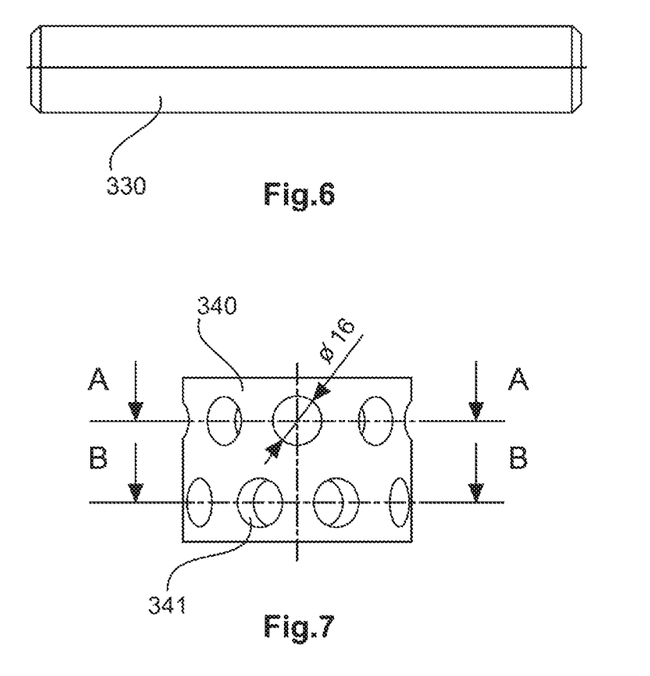
FIG. 6 shows a schematic representation of a threaded rod of the levelling unit according to the second exemplary embodiment.
FIG. 7 shows a view of a nut of a levelling unit according to the second exemplary embodiment, and FIGS. 8A-8B respectively show a schematic section view A-B and A-A and B-B of the nut of FIG. 7.

FIG. 6 shows a schematic representation of a threaded rod 330.

FIG. 7 shows a schematic representation of the nut 340. The nut 340 has a plurality of holes 341 and optionally an internal thread.

Figure 8A:
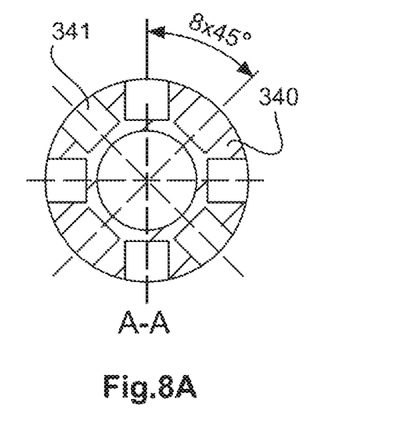
Figure 8B:
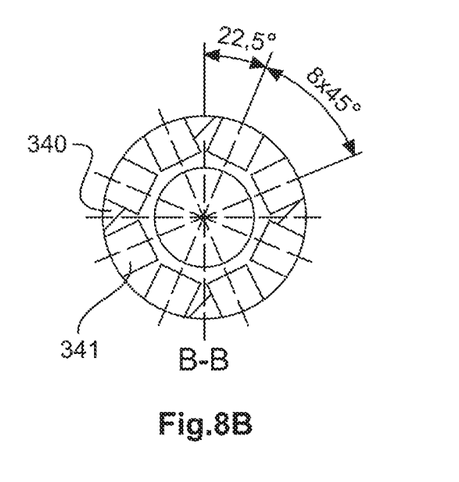

FIGS. 8A and 8B respectively show a section view, along A-A and B-B, of the nut of FIG. 7. The nut 340 has a plurality of holes 341 on its outer side.

The invention claimed is:

1. A wind turbine tower, comprising:
a plurality of tower segments that are stacked one on top of another on a foundation to form the wind turbine tower,
wherein the plurality of tower segments includes a lower tower segment having a lower end face and a lower region, wherein a plurality of cavities are located in the lower region of the lower tower segment, the lower tower segment including through bores between the lower end face of the lower tower segment and a bottom of each of the plurality of cavities,
wherein the lower tower segment is a precast concrete tower segment,
wherein each of the cavities is configured to receive a levelling unit for levelling the lower tower segment on the foundation.

2. The wind turbine tower according to claim 1, comprising the levelling units in the cavities, respectively, wherein each levelling unit has a supporting foot and a rod that are inserted through a respective one of the through bores into the cavity, and each levelling unit is configured to set a length of the rod for levelling the lowest tower segment.

3. The wind turbine tower according to claim 2, wherein each levelling unit has a hydraulic unit for setting a length of the rod for levelling the lower tower segment.

4. The wind turbine tower according to claim 2, wherein each levelling unit has a supporting frame with two sidewalls, a bottom, a cover, and an intermediate bottom,
wherein the bottom and the intermediate bottom each have a cutout such that the supporting frame is configured to be inserted into the cavity when the rod has been inserted through the through hole into the cavity.

5. The wind turbine tower according to claim 4, wherein for each levelling unit a nut is screwed onto the rod, wherein for arresting the levelling of the lower tower segment, the nut is screwed onto the rod such that the nut bears against the intermediate bottom.

6. The wind turbine tower according to claim 2, wherein the supporting foot and the rod are integrally formed.

7. A method for erecting a wind turbine tower comprising:
providing a lower tower segment on a foundation, the lower tower segment having a plurality of cavities in a lower region of the lower tower segment, wherein the lower tower segment has a plurality of through bores between a lower end face of the lower tower segment and a bottom of the cavity, wherein the lower tower segment is a precast concrete tower segment;
inserting ends of supporting feet through the plurality of through bores;
placing levelling units into the plurality of cavities; and
orienting and levelling the lower tower segment using the plurality of levelling units by setting a particular separation between a lower end of the supporting foot and the bottom of the cavity.

8. The method for erecting a wind turbine tower according to claim 7, wherein the lower tower segment with a plurality of supporting feet inserted into the through bores is placed on a foundation and a gap between the upper side of the foundation and the lower end face of the lower tower segment is filled with a casting compound, the method further comprising curing the casting compound.

9. A wind turbine, comprising:
a nacelle; and
a wind turbine tower according to claim 1, the nacelle located on the wind turbine tower.

* * * * *